United States Patent [19]

Kamalski

[11] 4,408,098

[45] Oct. 4, 1983

[54] RECEIVER WITH FIELD-STRENGTH DEPENDENT NOISE REDUCTION CONTROL

[75] Inventor: Theodor I. E. Kamalski, Eindhoven, Netherlands

[73] Assignee: U.S. Philips Corporation, New York, N.Y.

[21] Appl. No.: 274,979

[22] Filed: Jun. 18, 1981

[51] Int. Cl.³ .............................................. H04H 5/00
[52] U.S. Cl. ........................................ 381/11; 381/13
[58] Field of Search ............ 179/1 GE, 1 GJ, 1 GM, 179/1 GN, 1 P, 1 VL; 307/597; 455/50, 134, 150, 155–159, 218

[56] References Cited

U.S. PATENT DOCUMENTS

| | | | |
|---|---|---|---|
| 3,495,175 | 2/1970 | Munch | 455/50 |
| 3,821,649 | 6/1974 | Grosjean | 179/1 GM |
| 3,840,820 | 10/1974 | Kawada | 455/218 X |
| 4,063,039 | 12/1977 | Endres et al. | 179/1 GJ |
| 4,107,614 | 8/1978 | Sugai | 455/218 X |

*Primary Examiner*—A. D. Pellinen
*Attorney, Agent, or Firm*—Jack Oisher; William J. Streeter; Edward W. Goodman

[57] ABSTRACT

Receiver comprising a field-strength detector for measuring the received signal amplitude and a noise reduction circuit connected thereto via a control signal generating device for reducing audio-frequency noise in the output signal of the receiver, which control signal generating device has an attack and a recovery time constant at a decrease and an increase, respectively, of the received signal amplitude measured by the field strength detector, the recovery time constant being greater than the attack time constant. By adequate control of the cross-talk attenuation of a stereo signal and of the audio band-width, sudden variations in the sound quality at rapid and large field strength variations are prevented. To this end the control must be continuous and must, in the event of field strength variations follow the decrease of the field strength more rapidly than the increase.

5 Claims, 9 Drawing Figures

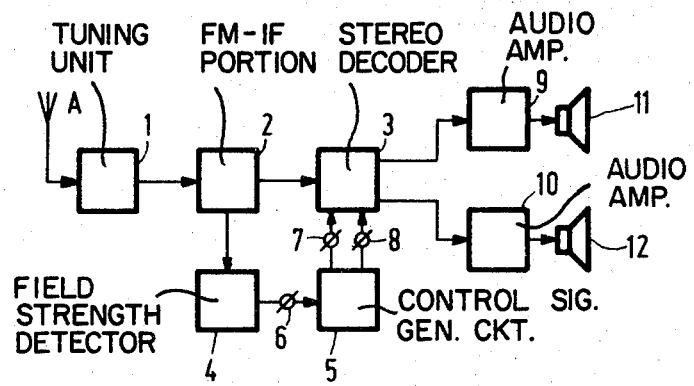
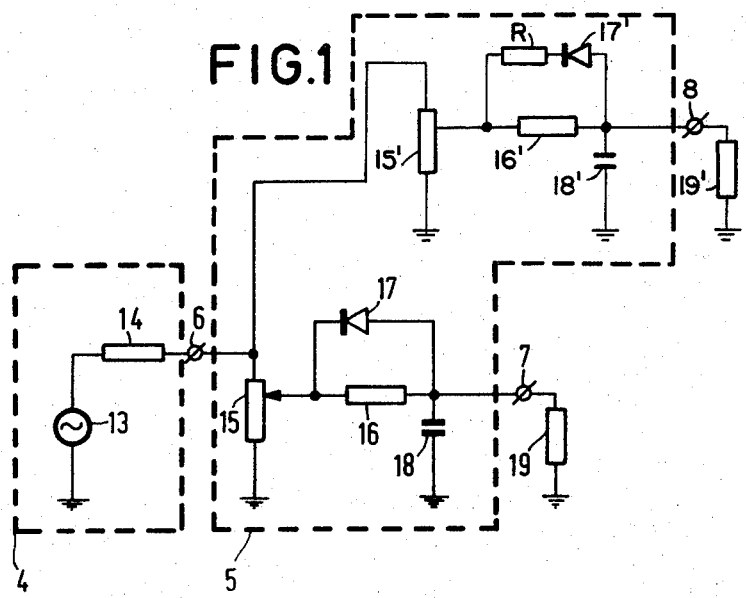
FIG.1
FIG.2

RECEIVER WITH FIELD-STRENGTH DEPENDENT NOISE REDUCTION CONTROL

BACKGROUND OF THE INVENTION

The invention relates to a receiver comprising a field-strength detector for measuring the received signal amplitude and a noise reduction circuit connected thereto, via control signal generating device, for reducing audio-frequency noise in the output signal of the receiver, which control signal generating circuit has an attack time constant at a decrease of the received signal amplitude measured by the field-strength detector, and a recovery time constant being greater than the attack time constant.

Such a receiver is disclosed in U.S. Pat. No. 4,157,455.

The noise reduction circuit of the prior art receiver comprises a switchable low-pass filter which precedes a multiplex decoder. In a first switching state of this low-pass filter the whole multiplex signal is passed and in a second switching state only the portion of the multiplex signal over a frequency range up to 10 kHz.

A reduction of the noise in the audio signal to be reproduced is obtained by switching the low-pass filter from the first to the second switching state. The result thereof is that an abrupt change-over is effected from a stereophonic sound reproduction, wherein the impression is obtained that there are several spatially distributed sound sources, to a monophonic sound reproduction, wherein all the sound seems to come from one position. Switching actions of this type from stereo to mono and vice versa suggest spatial leaps and bounds of several sound sources and consequently cause a spatially unsteady sound. Simultaneously with the stereo-to-mono change-over actions, an abrupt suppression of the higher signal frequencies occurs in the monosignal to be reproduced, so that also the tone color of the sound reproduction changes jumpwise.

The switching signal for the control of the switchable low-pass filter is produced by the control signal generating circuit on the basis of the incoming signal field strength measured by the field-strength detector. If a certain threshold voltage is passed during a decrease of the field strength then a change-over from stereo to mono follows almost directly, as the attack time constant of the control signal generating device is substantially zero. At an increase of the field strength, at which said predetermined threshold voltage is exceeded, a switching from mono to stereo is not effected until after said recovery time constant. By choosing a large recovery time constant, it is on the one hand indeed prevented that rapid field strength variations around the threshold voltage result in fast repeating mono-to-stereo change-overs, but on the other hand the duration of the mono-reproduction in response to such field strength variations may become annoying in length.

In addition, at field strength variations at which the threshold voltage is passed, sudden changes occur in the signal-to-noise ratio of the reproduction-audio signal, which, especially when they occur repeatedly, are experienced as particularly annoying.

SUMMARY OF THE INVENTION

The invention has for its object to obviate the above-mentioned drawbacks.

According to the invention, a receiver of the type defined in the preamble is therefore characterized in that the noise reduction circuit comprises a continuously variable tone control device and a continuously variable mono-stereo control device, the two devices being connected to the control signal generating device for a gradual control during at least an increase of the field strength.

When the measure in accordance with the invention is used, a continuous mono-stereo control and tone control is effected, whereby each decrease of the field strength is followed substantially directly by the control and each increase of the field strength is followed very gradually, after being integrated, by the control.

This results in a sound effect which, both spatially and as regards to frequency, is more steady than with the prior art receiver, while the variations in the signal-to-noise ratio of the reproduced signal can be kept low, even at rapid and large field strength variations. At a proper choice of the two time constants and a proper variation of the mono-stereo-control and tone control, it is possible to maintain, depending on the circumstances, an optimum sound quality depending on the field strength during field strength variations. In addition, the receiver in accordance with the invention provides the possibility to operate the mono-stereo control independent of the tone control, as a result of which the losses in the sound quality during field strength variations can be limited still further.

A gradual mono-stereo control in dependence on the field strength is known per se from the German published Patent Application No. 1939422. Herein, however, the cross-talk between the two stereo signals varies in a direct relationship with the field strength, so that rapid field strength variations, for example when the control is employed in a car radio, produce disturbing fast repeating mono-stereo reproduction alternations and consequently a spatially very unsteady sound.

A preferred embodiment of the receiver in accordance with the invention is characterized in that the control signal generating device is connected to the continuously variable mono-stereo control arrangement of the noise reduction circuit and applies thereto a mono-stereo control signal which continuously varies versus the field strength, having an attack time constant of not more than 40 msec. and a recovery time constant of at least 200 msec.

When this measure is employed e.g. in a car-radio, in spite of rapid field strength variations such as occurring in practice on a car aerial, an acceptable mono-stereo control is obtained, while, under the circumstances an optimum sound quality is maintained.

A further preferred embodiment of a receiver in accordance with the invention is characterized in that the control signal generating device is connected to the tone control of the noise reduction circuit and applies thereto a tone control signal which continuously varies versus the field strength and has a recovery time constant of at least 300 msec. and an attack time constant of not more than 0.8 times the recovery time constant.

Even when using the receiver as a car radio, said measure results in a tone control which is satisfactory in practice.

A still further preferred embodiment of such a receiver in accordance with the invention is characterized in that the control signal generating device comprises a RC-network which is connected to the field strength detector and the resistance of which is at least partially shunted by a switching diode which is connected in the pass direction for the discharging current of the capacitor of the RC network.

DESCRIPTION OF THE DRAWINGS

The invention will now be further explained with reference to the Figures which are shown by way of example in the accompanying drawings.

Herein:

FIG. 1 shows a block schematic circuit diagram of a receiver in accordance with the invention, FIG. 2 shows a practical embodiment of a control signal generating device for use in the receiver shown in FIG. 1, FIGS. 3a–3c are time diagrams showing the behaviour of a field strength variation and the mono-stereo control voltage $V_c$ derived therefrom and cross-talk attenuation.

DESCRIPTION OF THE PREFERRED EMBODIMENT

Figure 3:
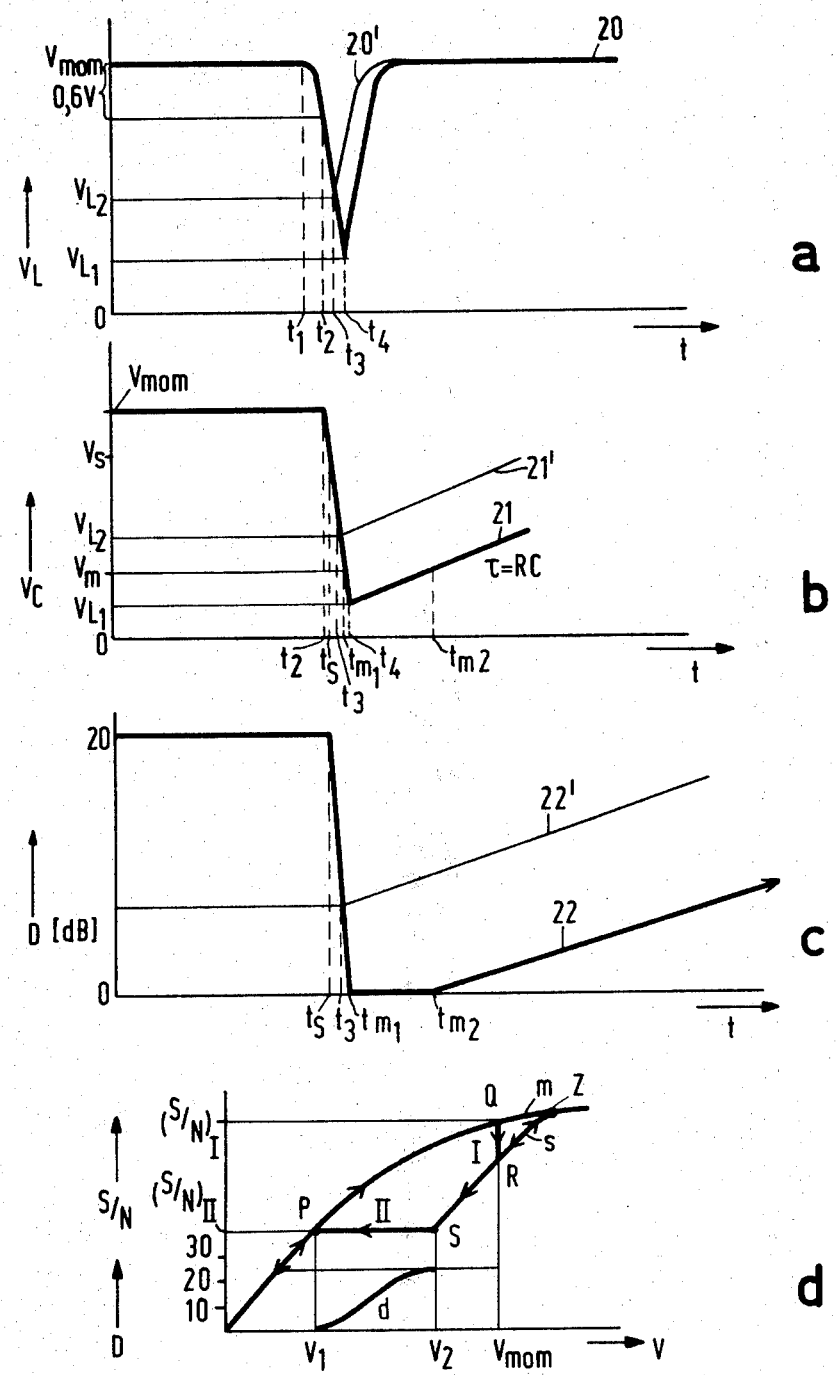
FIG. 3d is a graphic representation of the variation of the mono-stereo control as a function of the field strength.

FIG. 1 shows a receiver 1-8 in accordance with the invention having a tuning unit 1 connected to the aerial A, a FM-intermediate frequency portion 2 and a stereo decoder 3. In these circuits a desired radio stereo signal is selected and IF-converted from the radio signal received at the aerial A, and decoded into audio-frequency left and right stereo signals. Thereafter these stereo signals are applied via audio amplifiers 9 and 10 to loudspeakers 11 and 12, where the electric audio-frequency stereo signals are converted into audible vibrations.

The FM-intermediate frequency portion 2 is also connected to a control signal generating device 5 via a field-strength detector 4. The field-strength detector 4 produces a signal voltage at an output 6, which is a measure of the field strength of the received signal. A field strength detector of this type is known per se from, for example, U.S. Patent Specification No. 3,821,649, and a further description thereof is not necessary for an understanding of the invention. Via control terminals 7 and 8, the control signal generating device 5 is connected to the stereo decoder 3 for applying, respectively, a continuous mono-stereo and a tone control signal. The stereo decoder 3 comprises an integrated circuit of the type TDA 1005 which, in known manner, realizes a continuously increasing cross-talk attenuation between the left and right stereo signals at the outputs of the stereo decoder 3 when increasing continuously the control voltage on the control terminal 7 as well as a continuous increase of the frequency band of the audio signal when increasing continuously the control voltage on the control terminal 8.

FIG. 2 shows a practical embodiment of the control signal generating device 5 of the preceding Figure in which a control signal for the mono-stereo control and a control signal for the tone control is generated. For the sake of clarity, the field-strength detector 4 is shown as a variable voltage source 13 having an internal source resistor 14, and loads of the stereo decoder 3 at the control terminals 7 and 8 are shown as load resistors 19 and 19′; respectively.

The control signal generating device 5 comprises, connected between the output 6 of the field-strength detector 4 and ground, a potentiometer 15, the wiper of which is connected to a series RC network formed by a resistor 16 and a grounded capacitor 18. The junction point of the resistor 16 and the grounded capacitor 18 is connected to the control terminal 7. The resistor 16 is shunted by a diode 17 which is arranged so that it provides a conductive path from the capacitor 18 to the potentiometer 15. Charging of the capacitor 18 is effected from the field-strength detector 4 and the potentiometer 15 via the resistor 16, discharging of said capacitor is effected via the then short-circuited diode 17.

By choosing the value of the resistor 16 many times greater than the resistance value at the wiper of the potentiometer 15, the integration constant during a positive voltage difference between the wiper voltage $V_L$ and the capacitor or control voltage $V_C$, designated recovery time constant hereafter, is many times larger than the integration constant during a negative voltage difference between the two voltages, which is designated the attack time constant hereafter. The recovery time constant is then predominantly determined by the RC-time constant of the capacitor 18 with the resistor 16, which may amount to 0.2 to 2 sec. for a proper operation of the mono-stereo control. The attack time constant is determined by the RC time constant of the capacitor 18 with the very low parallel value of the potentiometer 15 and the internal source resistor 14, and may be ignored. In practice it has been found that at an attack time constant of not more than 40 msec., the mono-stereo control still functioned correctly. The range of the control voltage $V_C$ at the control terminal 7 is adjustable by means of the potentiometer 15 to the voltage range required for an adequate mono-stereo control of the stereo decoder 3.

The wiper voltage $V_L$ varies in proportion with the field strength of the received signal, which field strength is measured by the field-strength detector 4, while the cross-talk attenuation varies versus the control voltage $V_C$. As the recovery time constant is many times greater than the attack time constant, an increase in the field strength is followed very gradually, after time integration, with the recovery time constant by an increase in the cross-talk attenuation while a decrease in field strength is followed almost immediately, in a direct dependence, by the cross-talk attenuation.

To illustrate this, the FIGS. 3a to 3c, inclusive show, respectively, the variation versus time of the field strength of the received signals expressed in the wiper voltage $V_L$ (curves 20 and 20′) and the variation versus time of the control voltage $V_C$ (curves 21 and 21′) and the cross-talk attenuation D (curves 22 and 22′) in the stereo decoder 3. At a stationary reception of a high field strength, for example 500 $\mu V$ in the time interval 0-$t_1$, $V_L$, and also $V_C$, are equal to a high instantaneous voltage value $V_{mom}$. The cross-talk attenuation or signal separation is then at its maximum, for example 26dB, so that a full stereo reproduction takes place. At the instant $t_1$ the field strength decreases, for example owing to signal reflections. This causes the wiper voltage $V_L$ to decrease proportionally and at instant $t_2$ the wiper voltage has decreased for an amount in the order of the cut-off voltage of the diode 17 relative to the control voltage $V_C$. At this instant the diode 17 is rendered conductive and a rapid discharge of the capacitor 18 is effected via this diode 17, until $V_C = V_L$. In response thereto, after the instant $t_2$, the control voltage $V_C$ follows in a direct relationship the wiper voltge $V_L$ (see FIG. 3b). At instant $t_s$, $V_C$ passes a first threshold voltage $V_S$, at which the mono-stereo control of the stereo decoder 3 become operative (FIG. 3c). After the instant $t_s$ the cross-talk attenuation decreases in direct dependence on the wiper voltage $V_L$ and consequently on the field strength.

If the field strength variation behaves as shown in FIG. 3a by means of the curve 20, the control voltage $V_C$ passes a second threshold voltage $V_m$ at the instant $t_{m1}$ (FIG. 3b), the cross-talk attenuation then being reduced to zero (FIG. 3c) and the stereo decoder realizing a full mono reproduction. A further decrease of the voltages $V_L$ and $V_C$ until the voltage value $V_{L1}$ at instant $t_4$, where the field strength is minimal, has no further influence on the cross-talk attenuation. The increase of the field strength after the instant $t_4$ is followed very gradually by the control voltage $V_C$ after time integration with said recovery time constant, as shown by means of the curve 21 in FIG. 3b. At instant $t_{m2}$, $V_C$ exceeds the second threshold voltage $V_m$, whereafter the mono-stereo control becomes operative and the cross-talk attenuation increases very gradually, as is illustrated by means of the curve 22 in FIG. 3c.

If the field strength variation behaves as illustrated by means of the curve 20' in FIG. 3a, then the voltages $V_L$ and $V_C$ decrease only to a value $V_{L2}$ at instant $t_3$ and the second threshold voltage $V_m$ is not reached. As in the preceding case, after this instant $t_3$, the increase in field strength is followed very gradually by the control voltage $V_C$ after time integration with the said recovery time constant (curve 21', FIG. 3b) and at the same time produces a cross-talk attenuation which increases in dependence on the control voltage $V_C$, as shown by curve 22' in FIG. 3c. At field strength variations of this type a certain degree of cross-talk attenuation remains and the stereophonic sound impression is not interrupted.

Field strength variations which follow each other within the recovery time constant result in an ever smaller decrease of the cross-talk attenuation until finally a full mono-reproduction is obtained and maintained during further field strength variations. This results in a spatially steady sound. In addition, the variation of the signal-to-noise ratio during field strength variations of the above type is small, which will be further explained hereafter.

FIG. 3d illustrates the statically measured variation of the signal-to-noise ratio of the signal to be reproduced, as a function of the field strength V at full mono-reproduction by means of curve M, and at full stereo-reproduction by means of curve S. Curve d illustrates the variation of the cross-talk attenuation D as a function of the field strength V, a mono-stereo transition being obtained during which the signal-to-noise ratio does not noticeably vary.

At voltage fluctuations as illustrated by means of curve 20, the signal-to-noise ratio decreases versus the field strength from the instant $t_1$. During this decrease in field strength the curve s is first followed from point R (at $V = V_{mom}$) to point S at which the field strength V reaches the value $V_2$. At this point, the field strength may amount from 180 $\mu V$ to 300 $\mu V$ and the control voltage $V_C$ reaches the control range of the mono-stereo control. A decrease of the cross-talk attenuation thereafter takes place which varies as a function of the field strength V, as shown by curve d. From the German Patent Application mentioned in the foregoing it is known that at such a variation of the cross-talk attenuation D as a function of the field strength V, the signal-to-noise ratio does not noticeably vary. This is illustrated by means of curve II. At a field strength $V_1$ of 30 to 40 $\mu V$ the end of the mono-stereo control range is attained to point P and at a further decrease of the field strength V a further decrease of the signal-to-noise ratio follows in accordance with curve m.

After the instant $t_4$ the field strength rapidly increases in accordance with the curve 20 until the instantaneous field strength $V_{mom}$ is reached again. During this rapid field strength increase, the reproduction remains monophonic, which means that the signal-to-noise ratio increases in accordance with the curve m, until point Q. Thereafter, owing to the large recovery time constant, a gradual mono-stereo transition takes place, causing the signal-to-noise ratio to gradually decrease in accordance with curve I. After termination of the control in point R, the reproduction is fully stereophonic and at a long term average field-strength increase, the signal-to-noise ratio may further increase in accordance with curve s.

It will be clear that at a high value of the instantaneous field strength, for example in point Z, the decrease of the signal-to-noise ratio during the gradual transition from mono to stereo reproduction is so small as to be ignored.

Compared with said prior art, wherein abrupt mono-stereo change-overs are effected, the circuit in accordance with the invention has therefore in addition to the advantages already described in the foregoing, the property of a gradual variation of the signal-to-noise ratio.

The gain in signal-to-noise ratio with respect to a mono-stereo control having negligible attack and recovery time constants, as described in, for example said German Patent Application is represented by the area enclosed by the curves m, s, I and II.

In the receiver in accordance with the invention it is possible to employ, independent of the mono-stereo control described in the foregoing, a gradual tone control in dependence on the field strength. Herein, the frequency characteristic of the signal to be reproduced varies gradually between (see FIG. 4c) curves $f_2$ at a maximum field strength and $f_1$ at a minimum field strength. At a decrease in field strength the tone control effectuates a gradually increasing attenuation for signals above 1 kHz. A correct tone control is obtained if the signal attenuation at the transition from $f_2$ to $f_1$ amounts above the audio-frequency of at least 2 kHz to at least 2 dB per octave. Preferably, the maximum signal attenuation at 10 kHz is approximately 10 dB.

Figure 4:
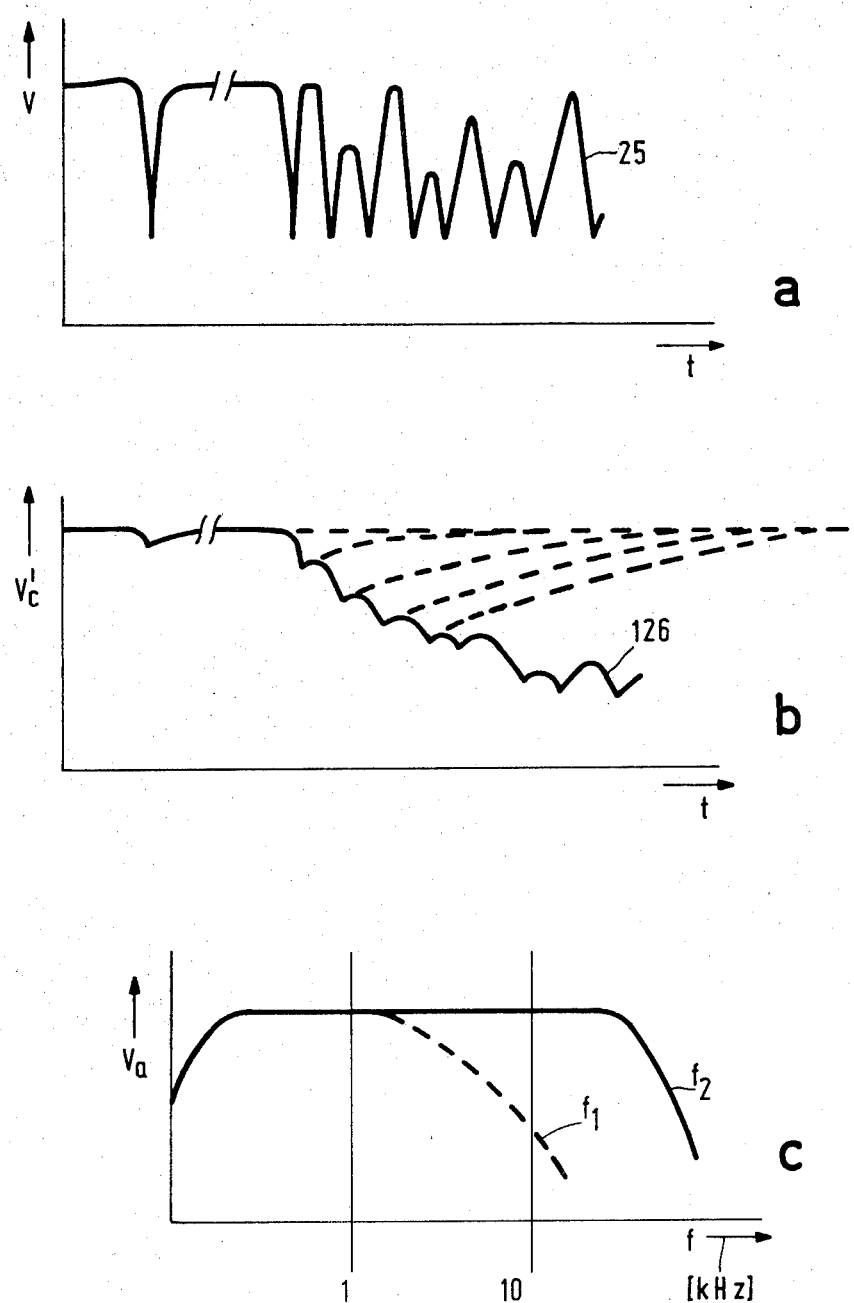
FIGS. 4a and 4b are time diagrams in which the behaviour of a number of consecutive field strength variations and the tone control voltage $V_f$ derived therefrom are shown.
FIG. 4c shows the frequency characteristic of the audio signal at a minimum and a maximum value of the field strength.

In order to prevent the higher signal frequencies from being amplitude-modulated in the rhythm of the field strength variations which may for example, have the shape shown by means of curve 25 in FIG. 4a, the tone control must follow the time integrated field strength variations. In order to also obtain a gradual decrease of the higher signal frequencies at consecutive field strength variations, the recovery time constant should be greater than the attack time constant, which was also the case at the mono-stereo control. The recovery time constant should preferably be greater than 0.3 sec.

In practice, it was however experienced as annoying when the high signal frequencies were directly attenuated to the maximum extent at single field strength variations or dips. In order to avoid this, the attack time constant of the tone control signal must be many times greater than that of the mono-stereo control signal and must preferably not exceed approximately 0.8 times the recovery time constant of the tone control signal.

Such a tone control signal may be generated by means of the circuit 15'–18' of FIG. 2, in which a resistor R is arranged in series with the diode 17'. By choosing the value of this resistor R to be approximately half the value of the resistor 16', the desired recovery time constant is obtained.

The variation of the tone control voltage $V_C$, versus time at field strength variations as shown by means of curve 25 in FIG. 4a, is illustrated by means of curve 26 in FIG. 4b.

It is of course alternatively possible to derive a digital control signal for the mono-stereo control and the tone control with the same attack and recovery time constants as the analog control voltage $V_C$. The voltage at the output 6 of the field strength detector 4 may then be measured digitally and integrated in an adder circuit. The time constants can be adjusted by means of a divider connected between the adder circuit and the control terminal 7 and 8, respectively.

The division factor of the divider should be greater at a field strength increase than at a field strength decrease. The invention is therefore not limited to analog control signal generating circuits as shown in FIG. 2.

What is claimed is:

1. A receiver comprising a field-strength detector for measuring the received signal amplitude and a noise reduction circuit connected thereto via control signal generating means for reducing audio-frequency noise in the output signal of the receiver, which control signal generating means has an attack time constant at a decrease of the received signal amplitude measured by the field-strength detector, and a recovery time constant at an increase of the received signal amplitude, said recovery time constant being greater than the attack time constant, the noise reduction circuit comprising a continuously variable tone control circuit and a continuously variable mono-stereo control circuit, these two circuits being connected to the control signal generating means for a gradual control during at least an increase of the field strength, characterized in that said control signal generator means comprises a first control signal generating circuit, connected to the continuously variable mono-stereo control circuit of the noise reduction circuit, which applies thereto a mono-stereo control signal which varies continuously versus the field strength having an attack time constant of not more than 40 msec. and a recovery time constant of at last 200 msec., and said control signal generating means further comprises a second control signal generating circuit, connected to the continuously variable tone control circuit of the noise reduction circuit, which applies thereto a tone control signal which continuously varies versus the field strength with a recovery time constant of at least 300 msec. and an attack time constant of not more than 0.8 times the recovery time constant.

2. A receiver as claimed in claim 1, characterized in that said second control signal generating circuit comprises an RC network connected to said field strength detector, the resistor in said RC network being shunted by a series arrangement of a switching diode and a further resistor.

3. A receiver as claimed in claim 1, characterized in that said first control signal generating circuit comprises an RC network connected to the field strength detector, the resistor of said RC network being shunted by a switching diode which provides a conductive path for the discharge current of the capacitor of the RC network.

4. A receiver as claimed in claim 1 or 3, characterized in that at the mono-stereo transition the signal-to-noise ratio is not more than 55 dB.

5. A receiver as claimed in claim 1 or 2, characterized in that at a very low field strength the amplitude of audio frequencies above at least 2 kHz are attenuated by at least 2 dB/octave with respect to the audio frequencies at a maximum field strength and that the signal attenuation at 10 kHz is from 8 to 10 db.

* * * * *